US012677117B2

(12) United States Patent
Hassan et al.

(10) Patent No.: US 12,677,117 B2
(45) Date of Patent: Jul. 7, 2026

(54) METHOD FOR OPERATING A CONTROL UNIT AND A DETERMINATION UNIT OF A LIGHTWEIGHT VEHICLE

(71) Applicant: Robert Bosch GmbH, Stuttgart (DE)

(72) Inventors: Khaled Shawky Hassan, Laatzen (DE); Nadia Brahmi, Hildesheim (DE); Frank Hofmann, Hildesheim (DE); Andre Schwarzmeier, Reutlingen (DE); Andreas Schaller, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 371 days.

(21) Appl. No.: 17/508,149

(22) Filed: Oct. 22, 2021

(65) Prior Publication Data

US 2022/0132282 A1 Apr. 28, 2022

(30) Foreign Application Priority Data

Oct. 23, 2020 (EP) .................................... 20203626

(51) Int. Cl.
*H04W 4/40* (2018.01)
*H04W 74/00* (2009.01)

(52) U.S. Cl.
CPC ........... *H04W 4/40* (2018.02); *H04W 74/002* (2013.01)

(58) Field of Classification Search
CPC ........... H04W 4/40; H04W 4/02; H04W 4/90; H04W 4/46; H04W 40/20; H04W 12/03;
(Continued)

(56) References Cited

U.S. PATENT DOCUMENTS 10,210,678 B1 2/2019 Manzella et al.
10,913,511 B2 2/2021 Iino et al.
(Continued)

FOREIGN PATENT DOCUMENTS

CN 202429321 U 9/2012
CN 205440664 U 8/2016

OTHER PUBLICATIONS

Moped definition, Cambridge Advanced Learner's Dictionary & Thesaurus [online]. [retrieved Nov. 15, 2024]. Retrieved from the Internet: <https://dictionary.cambridge.org/us/dictionary/english/moped> (Year: 2024).*

(Continued)

*Primary Examiner* — Charles C Jiang
*Assistant Examiner* — Rachel Elizabeth Marks
(74) *Attorney, Agent, or Firm* — Michael Best & Friedrich LLP

(57) ABSTRACT

A method for operating a determination unit (DUb) of a personal mobile terminal or a device with a user interface (UIb). In one example, the method includes receiving, via at least one communication channel (CHb) between the determination unit (DUb) and a control unit (CUb) of a vehicle (BICb), at least one sensor information; determining at least one status information associated with the vehicle (BICb) based on the received at least one sensor information; and transmitting, via the at least one communication channel between the determination unit (DUb) and the control unit (CUb), the at least one determined status information associated with the vehicle (BICb).

16 Claims, 2 Drawing Sheets

(58) Field of Classification Search

CPC ......... H04W 4/027; H04W 4/38; H04W 4/44; H04W 48/18; H04W 64/00; H04W 72/04; H04W 74/0816; H04W 76/14; H04W 8/24; H04W 84/005; H04W 92/18; G08G 1/162; G08G 1/166; G08G 1/168; H04L 5/0005; H04L 5/0037; H04L 5/0048; H04L 67/12

See application file for complete search history.

(56) References Cited

U.S. PATENT DOCUMENTS

| | | | | |
|---|---|---|---|---|
| 10,994,739 | B2 * | 5/2021 | Giraud | G01G 19/4142 |
| 11,046,308 | B2 | 6/2021 | Hehn et al. | |
| 2010/0198453 | A1 | 8/2010 | Dorogusker et al. | |
| 2014/0209400 | A1 | 7/2014 | Yao et al. | |
| 2017/0280436 | A1 * | 9/2017 | Park | B61L 3/125 |
| 2018/0075750 | A1 | 3/2018 | Takamura et al. | |
| 2019/0069248 | A1 * | 2/2019 | Singh | H04W 52/0296 |
| 2019/0208387 | A1 | 7/2019 | Jiang et al. | |
| 2020/0142408 | A1 * | 5/2020 | Valois | G05D 1/0231 |
| 2020/0193829 | A1 * | 6/2020 | Cheng | G08G 1/168 |
| 2021/0352590 | A1 * | 11/2021 | Marsh | H04W 52/0261 |
| 2022/0028264 | A1 * | 1/2022 | Lund | G08G 1/096783 |
| 2022/0030430 | A1 * | 1/2022 | Lund | H04W 8/24 |
| 2022/0045798 | A1 * | 2/2022 | Tang | H04L 5/0053 |
| 2022/0132405 | A1 * | 4/2022 | Schwarzmeier | H04W 4/44 |
| 2023/0036475 | A1 * | 2/2023 | Yu | G08G 1/096844 |
| 2023/0067689 | A1 * | 3/2023 | Hwang | H04W 4/40 |
| 2023/0141342 | A1 * | 5/2023 | Hassan | H04W 72/23 |
| | | | | 370/329 |
| 2023/0182848 | A1 * | 6/2023 | Hassan | B62J 50/22 |
| | | | | 701/22 |

OTHER PUBLICATIONS

Anupriya Basu, The History of Laws on Cellphone Use While Driving, Nov. 19, 2019 [retrieved Apr. 12, 2025]. Retrieved from the Internet:<URL: https://healinglaw.com/blog/cellphone-driving-laws/ >. (Year: 2019).*

* cited by examiner

METHOD FOR OPERATING A CONTROL UNIT AND A DETERMINATION UNIT OF A LIGHTWEIGHT VEHICLE

BACKGROUND OF THE INVENTION

The description concerns advances in communication and control of lightweight vehicles.

SUMMARY OF THE INVENTION

According to a first aspect, a method for operating a control unit of a vehicle, especially of a pedal electric cycle or of an electric kick scooter, comprises: receiving at least one sensor information associated with a sensor of the vehicle; transmitting, via a at least one communication channel between the control unit and a determination unit, the at least one sensor information; receiving, via the at least one communication channel between the control unit and the determination unit, at least one status information associated with the vehicle; and transmitting, via at least one radio channel, at least one message, especially a V2X message and/or a VRU message, comprising the received at least one status information associated with the vehicle.

Advantageously, the control unit is not responsible for determining the status information of the vehicle in dependence on the at least one sensor information. Therefore, the control unit can be equipped with a reduced processing capacity. A cheaper control unit with a V2X communication capability is provided, because the V2X service capability is on the distributed unit.

According to an advantageous example, the control unit has at least one radio channel connected to a Radio Network, and receives/transmits at least one Uu message including at least one configuration and at least V2X services over Uu link.

According to an advantageous example, the at least one radio channel is a dedicated link, especially a dedicated sidelink (D2D, direct WiFi, Adhoc WiFi, etc.) in which the link may be operated in unlicensed band or licensed (control) band.

According to an advantageous example, the method comprises: receiving, via the radio channel, at least one further message, especially a V2X message and/or a VRU message, comprising at least one status information associated with a further vehicle; transmitting, via the at least one communication channel between the control unit and the determination unit, the at least one received status information associated with the further vehicle; receiving, via the at least one communication channel between the control unit and the determination unit, at least one reaction information; and operating the vehicle based on the received at least one reaction information.

The reaction information is advantageously determined on the side of the separate determination unit.

According to an advantageous example, the method comprises: receiving, via the communication channel, the at least one status information associated with the determination unit; and wherein the transmitting, via the at least one communication channel between the control unit and the determination unit, of the at least one sensor information and/or of at least the information based thereon is based on the at least one status information.

Via the received status information, the control unit is enabled to stop and to start the transmission of the at least one sensor information based on the status of the determination unit. For example, if the personal determination unit signals via the at least one status information, that a coordination unit for maneuver coordination is disabled, then the control unit may decide to cease transmission of the at least one sensor information.

According to an advantageous example, the method comprises: transmitting, via the communication channel between the control unit of the vehicle and the determination unit, at least one capability information associated with the vehicle.

Advantageously, the at least one capability information allows the determination unit to adapt its functions to the capabilities of the vehicle.

According to an advantageous example, the method comprises: transmitting (140), via the communication channel (CHb) between the control unit (CUb) of the vehicle (BICb) and the determination unit (DUb), at least one V2X message, especially in real-time or in almost real time, using a high throughput and latency channel including at least wireline or wireless link, which include at least a direct communication link using sub 7 GHz channel or cm/mm-wave technology.

According to a second aspect of the description, a method for operating a determination unit, especially a personal mobile terminal or a device with a user interface, comprises: receiving, via at least one communication channel between the determination unit and a control unit of a vehicle, at least one sensor information; determining at least one status information associated with the vehicle based on the received at least one sensor information; and transmitting, via the at least one communication channel between the determination unit and the control unit, the at least one determined status information associated with the vehicle.

As the determination unit is apart from the control unit, the determination unit can be used for determining sophisticated maneuver functions due to more processing capacity than the control unit.

According to an advantageous example, the method comprises: receiving, via the at least one communication channel between the control unit and the determination unit, at least one status information associated with a further vehicle; determining at least one reaction information based on the received at least one status information associated with the further vehicle; and transmitting, via the at least one communication channel between the control unit and the determination unit, the at least one determined reaction information.

Shifting the determination of the reaction information towards the determination unit will result in a cheaper control unit as no complex and costly processing capacity has to be provided by the control unit.

According to an advantageous example, the method comprises: determine or receive environment information associated with the determination unit; and wherein the determining of the at least one reaction information is based on the received at least one status information of the other vehicle and is based on the determined or received environment information.

By taking into account the environment information, the reaction information can be adapted to the environment the operated vehicle resides in. For example, bad weather conditions indicate a longer braking distance for emergency braking, and therefore, the brakes of the vehicle have to be operated accordingly. For this, the determination unit should be connected with, e.g., a weather station, and/or internet. So ,for example, the determination unit is connected to cloud service for weather, maps, etc.

According to an advantageous example, the method comprises: determining at least one status information associated with the determination unit; and transmitting, via the communication channel between the at least one status information associated with the determination unit.

For example, if the status information indicates a low battery status or a malfunction, then the control unit may initiate a shutdown of its V2X services or parts thereof, or go in a low power VRU mode.

According to an advantageous example, the method comprises: receiving, via the communication channel between the determination unit and the control unit of the vehicle, a capability information associated with the vehicle; and wherein the determining of the at least one reaction information for the vehicle is based on the received at least one status information associated with the further vehicle and on the received capability information.

Advantageously, the determination of the at least one reaction information is made according with the at least one received capability, the vehicle provides for conduction the actual reaction.

According to a third aspect of the description, a control unit of a vehicle, especially of a pedal electric cycle or of an electric kick scooter, comprises: receiving means to receive at least one sensor information associated with a sensor of the vehicle; transmitting means to transmit, via a at least one communication channel between the control unit and a determination unit, the at least one sensor information; receiving means to receive, via the at least one communication channel between the control unit and the determination unit, at least one status information associated with the vehicle; and transmitting means to transmit, via at least one radio channel, at least one message, especially a V2X message and/or a VRU message, comprising the received at least one status information associated with the vehicle.

According to a fourth aspect of the description, a lightweight vehicle, especially a pedal electric cycle or an electric kick scooter, comprises the control unit according to the preceding aspect.

According to a fifth aspect of the description, a determination unit, especially a personal mobile terminal or a device with a user interface, comprises: receiving means to receive, via at least one communication channel between the determination unit and a control unit of a vehicle, at least one sensor information; determining means to determine at least one status information associated with the vehicle based on the received at least one sensor information; and transmitting means to transmit, via the at least one communication channel between the determination unit and the control unit, the at least one determined status information associated with the vehicle.

BRIEF DESCRIPTION OF THE DRAWINGS

According to a sixth aspect of the description, a system comprising the control unit according to the third aspect and the personal mobile terminal according to the fifth aspect.

DETAILED DESCRIPTION

Figure 1:
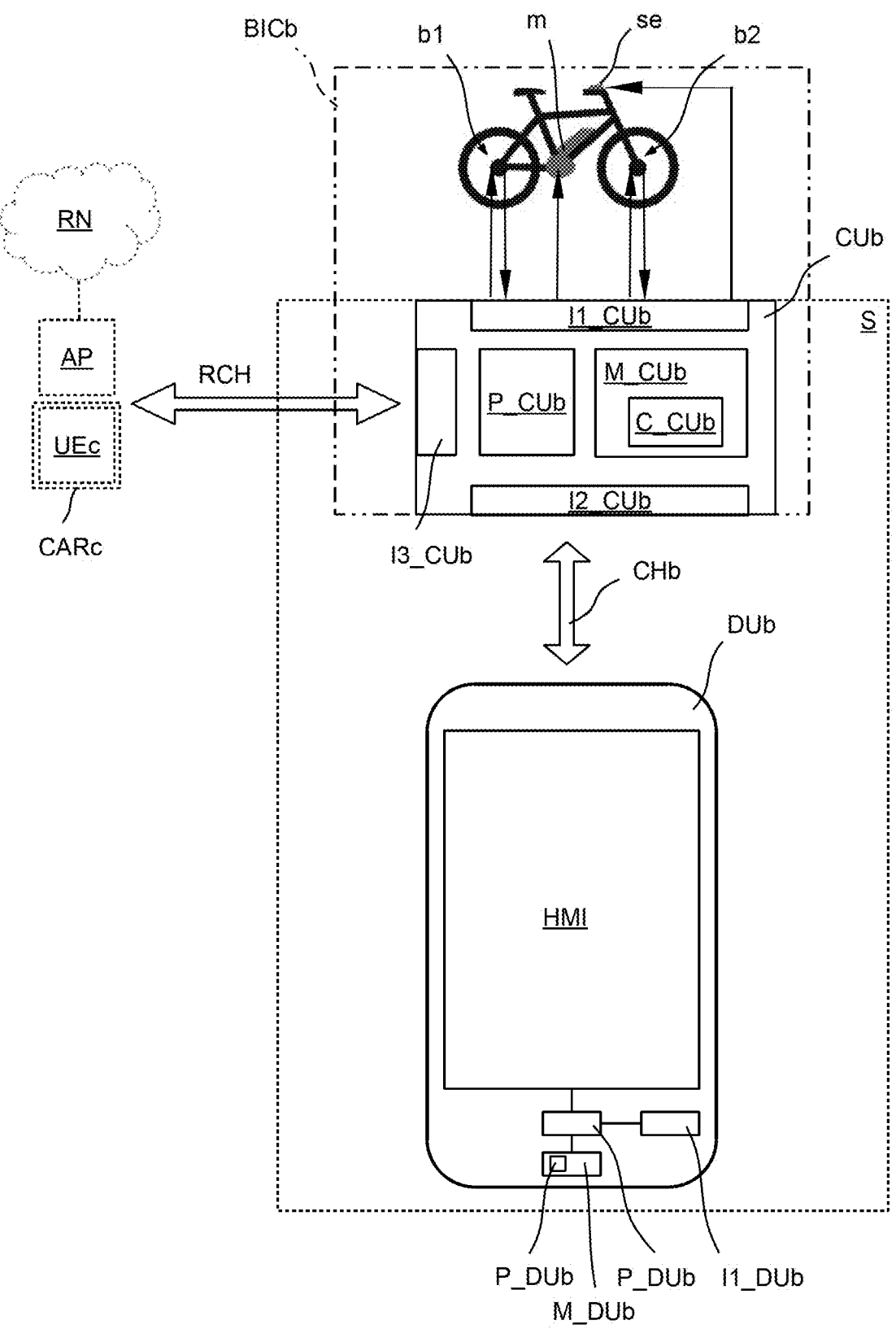
FIG. 1 depicts schematically a block diagram.

FIG. 1 depicts schematically a block diagram. A lightweight vehicle BICb is depicted as a pedal electric bicycle and comprises at least one actuator, at least one sensor, and a control unit CUb. For example, the lightweight vehicle BICb does not exceed 50 kg. The at least one actuator comprises at least one of the following: a brake b1, b2, a motor, and a signalizing entity se. The respective actuator provides at least one of the following functions: brake assistance, motor speed regulation, motor disengaging, alarm light, etc.

The at least one sensor comprises at least one of the following: a sensor for sensing a state of one of the brakes b1, b2; a sensor for sensing a motor state of the motor m, a sensor indicating an operating condition of an external lighting. Accordingly, sensor information may include information from at least one of the following sources: light sensors, brake sensors (e.g., gyro (inertia)-sensor or electronic braking system (e.g., EBS/ABS) device or a brake-lever switch/clutch), acceleration sensor, speed sensor, right/left turning sign/axis sensor, battery level sensor, motor vital information sensors.

The control unit CUb comprises a first interface I1_CUb for receiving signals from the at least one sensor and for transmitting at least one operating instruction to the at least one actuator.

The control unit CUb comprises a second interface I2_CUb for communicating via a channel CHb with a determination unit DUb.

The control unit CUb comprises a third interface I3_CUb to communicate via a radio channel RCH with a further radio terminal UEc of another vehicle CARc and/or with an access point AP to communicate with a backhaul entity or another communication entity in a remote network RN. The radio channel RCH can be one of the following: a direct communication channel to a mobile terminal UEc of another vehicle CARc; an uplink or downlink channel to/from the access point AP.

The control unit CUb comprises a memory unit M_CUb, and a processing unit P_CUb. On the non-transitory memory unit M_CUb, a computer program C_CUb is stored. When executing the computer program C_CUb on the processing unit P_CUb, the processing unit P_CUb causes, together with the memory unit M_CUb, and the interfaces I1_CUb, I2_CUb and I3_CUb, the control unit CUb to conduct the methods described herein.

The determination unit DUb comprises a first interface I1_DUb to communicate via the channel CHb with the control unit CUb.

The determination unit DUb comprises a memory unit M_DUb, a human machine interface HMI in form of a touch panel, and a processing unit P_DUb. On the non-transitory memory unit M_DUb, a computer program C_DUb is stored. When executing the computer program C_DUb on the processing unit P_DUb, the processing unit P_DUb causes, together with the memory unit M_DUb, and the interface I1_DUb, the determination unit DUb to conduct the methods described herein.

The determination unit DUb is adapted to transmit and receive V2X messages (V2X: Vehicle to everything) and/or to transmit and receive VRU messages (VRU: Vulnerable Road User).

Figure 2:
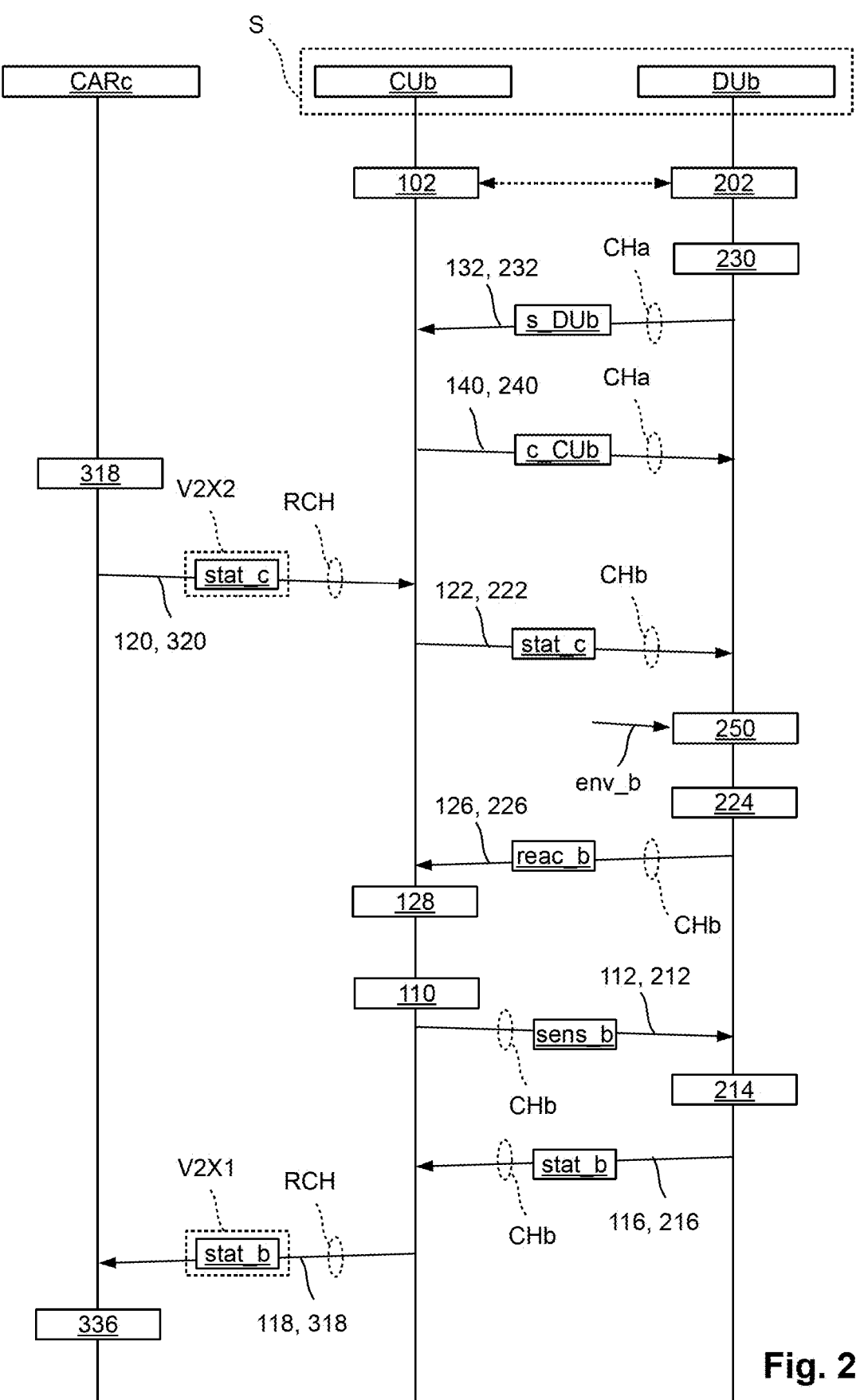
FIG. 2 depicts schematically a sequence diagram.

FIG. 2 depicts schematically a sequence diagram. By way of example, the vehicle associated with the control unit CUa is a bicycle and the other vehicle is a car. Of course, the other vehicle can be another bicycle. In another example, the bicycle communicates with a pedestrian-type user terminal.

According to steps 102 and 202, the control unit CUb and the determination unit DUb interface with each other to provide the communication channel CHa. The determination unit DUb (e.g., smart phone, tablet, vendor-specific apparatus) runs an application such that the determination unit DUb is able to communicate via the communication channel CHb with the control unit CUb. For example, the communication channel CHb is an interface that splits the application layer of the VRU/V2X service and the 3GPP protocol layer. The radio channel CHb has one of the following connectivity options:

Cable, when cable is connected to, e.g., charge the smart device

Near field communication (NFC): exchanging security information, association, and exchange control data, sensor information, and instructions Bluetooth: pairing with the eLM and exchanging data and control Wi-Fi (existing versions or advanced low-power version): used for association and/or sending/exchanging data.

a dedicated link, or a dedicated sidelink (D2D, direct WiFi, Adhoc WiFi, etc.) in which the link may be operated in unlicensed band or licensed (control) band, where in the bands may be on sub 7 GHz band or the higher than 7 GHz (e.g., cm-range wavelength and mm-range wavelength), wherein the latter supports high throughput (high data rates) and/or low latency requirements.

To have a secure connection via communication channel CHb, in order to avoid un-authorized access, an authentication between the CUb and the DUb is conducted. Both a security guard and functional-safety functionalities are implemented in CUb and DUb. Authentication is done between the CUb and the DUb, such that the DUb is able to associate with the CUb via:

a standardized key exchange/sharing, or a secure authentication mechanism running on the on-board device and the smart device application, e.g., the chipset of the CCU-like lower layer part has it so do the application (e.g., a vendor based app and CCU-like chipset)

a legalized e-Mobility ID programmed according licensing the e-Mobility, where the unique Key can associate with the Application (on the smart device DUb) running V2X services.

The further vehicle CARc determines 318 at least one status information stat_c associated with the further vehicle CARc. The status information stat_c comprises, for example, a planned trajectory of the further vehicle CARc. The further vehicle CARc transmits 320 the status information stat_c via the radio channel.

The control unit CUb receives (according to receiving means 120), via the radio channel RCH, at least one further message V2X2, especially a V2X message and/or a VRU message, comprising at least one status information stat_c associated with a further vehicle CARc.

The control unit CUb transmits (according to transmitting means 122), via the at least one communication channel CHb between the control unit CUb and the determination unit DUb, the at least one received status information stat_c associated with the further vehicle CARc.

The determination unit DUb receives (according to receiving means 222), via the at least one communication channel CHb between the control unit CUb and the determination unit DUb, at least one status information stat_c associated with a further vehicle CARc.

The determination unit DUb determines (according to determining or processing means 224) at least one reaction information reac_b based on the received at least one status information stat_c associated with the further vehicle CARc.

The determination unit DUb transmits (according to transmitting means 226), via the at least one communication channel CHb between the control unit CUb and the determination unit DUb, the at least one determined reaction information reac_b.

The determination unit DUb determines or receives (according to determining means or receive receiving means 250) environment information env_b associated with the determination unit DUb. The determining 224 of the at least one reaction information reac_b is based on the received at least one status information stat_c of the other vehicle CARc and is based on the determined or received environment information env_b.

The environment information env_b comprises, for example, at least one of the following: a weather condition received via a respective service on channel CHb, a position information received from a location sensor of the determination unit DUb, a temperature received from a sensor of the determination unit DUb, etc.

The determination unit DUb determines (according to determining or processing means 230) at least one status information s_DUb associated with the determination unit DUb.

The determination unit DUb transmits (according to transmitting means 232), via the communication channel CHb between the at least one status information s_DUb associated with the determination unit DUb.

The control unit CUb receives (according to receiving means 126), via the at least one communication channel CHb between the control unit CUb and the determination unit DUb, at least one reaction information reac_b.

The control unit CUb operates (according to operating means 128) the vehicle BICb based on the received at least one reaction information reac_b.

The control unit CUb receives (according to receiving means 110) at least one sensor information sens_b associated with a sensor of the vehicle BICb.

The control unit CUb transmits (according to transmitting means 112), via the at least one communication channel CHb between the control unit CUb and the determination unit DUb, the at least one sensor information sens_b.

The determination unit DUb receives (according to receiving means 212), via at least one communication channel CHb between the determination unit DUb and a control unit CUb of a vehicle BICb, at least one sensor information sens_b.

The determination unit DUb determines (according to determining or processing means 214) at least one status information stat_b associated with the vehicle BICb based on the received at least one sensor information sens_b.

V2X messages do not only represents a state information, there are also aligning messages. In this case it is an interactive message and carries commands as well. Let us define state information to:

Any state information represents by (shared) sensor information between the vehicles Any trajectory/paths/waypoints transmitted between the vehicles Further notifications Further relayed information Any alignment information including commands and notification According to an example, status information stat_b comprises the determined planned trajectory of the vehicle BICb. The determination unit DUb determines (according to the determining means 214) the trajectory of the vehicle BICb based on the received sensor information sens_b, compares the determined trajectory with the trajectory received via the status information stat_c. In dependence on the comparison, the determined trajectory is transmitted as the status information stat_a, or a further reaction (for transmitting the reaction to the control unit CUa) is determined by the determination unit DUb, and a new trajectory is determined by the determination unit DUb, and the determined new trajectory is transmitted by the control unit CUb via the radio channel RCH.

The determination unit DUb transmits (according to transmitting means 216), via the at least one communication channel CHb between the determination unit DUb and the control unit CUb, the at least one determined status information stat_b associated with the vehicle BICb.

The control unit CUb receives (according to receiving means 116), via the at least one communication channel CHb between the control unit CUb and the determination unit DUb, at least one status information stat_b associated with the vehicle BICb, in particular as a response to the transmitted at least one sensor information sens_b.

The control unit CUb transmits (according to transmitting means 118), via at least one radio channel RCH, at least one message V2X1, especially a V2X message and/or a VRU message, comprising the received at least one status information stat_b associated with the vehicle BICb.

After receiving 318 the status information stat_b from the control unit CUb, the other vehicle CARC adapts 336 its trajectory accordingly.

The control unit CUb receives (according to receiving means 132), via the communication channel CHb between the at least one status information s_DUb associated with the determination unit DUb. Transmitting 112, via the at least one communication channel CHb between the control unit CUb and the determination unit DUb, of the at least one sensor information sens_b and/or of at least the information based thereon is based on the at least one status information s_DUb.

For example, the status information s_DUb comprises an upper layer application status like ready, paused, initiating, etc. According to another example, the status information s_DUb comprises a battery status of the determination unit DUb.

According to an example, the transmitting 112 is conducted, if the status information s_DUb permits the transmission. For example, if the connectivity status of the control unit CUb indicates that no connection to another radio entity is available, then the transmission of the sensor information sens_b is ceased and/or listening to receive the reaction information reac_b is disabled.

According to an example, the frequency of the transmitting 112 is reduced, if the status information s_DUb indicates a low battery status of the determination unit DUb. The frequency of the transmitting 112 is increased, if the status information s_DUb indicates a high battery status of the determination unit s_DUb.

The control unit CUb transmits (according to transmitting means 140), via the communication channel CHb between the control unit CUb of the vehicle BICb and the determination unit DUb, at least one capability information c_CUb associated with the vehicle BICb.

The capability information c_CUb indicates, for example, which functionalities like an anti-lock braking system, warning signaling entities, brake types, motor types, etc. are available at the vehicle. Based on the capability information c_CUb, the determination unit Dub is capable to attend a variety of differently configured types of vehicles.

The determination unit DUb receives (according to receiving means 240), via the communication channel CHb between the determination unit DUb and the control unit CUb of the vehicle BICb, a capability information c_CUb associated with the vehicle BICb. The determining 222 of the at least one reaction information reac_b for the vehicle BICb is based on the received at least one status information stat_c associated with the further vehicle CARc and on the received capability information c_CUb.

The determined reaction information reac_b may include disengaging the motor, actuating the brake, or signaling a collision alarm to the driver, if a collision risk was determined via the determining 224.

A system S comprises the control unit CUa and the determination unit DUb.

In the following, we will introduce in details the proposed solutions for upper-layer split, which comprises: 1st an application running on UEa, the application is able to generate messages associated with the vulnerable road user (VRU) services. Then, 2nd VRU services is sent via the communication protocol stack of CUb either to the network or directly to other users. Hence, the software application together with the hardware of CUb do CCU functionality and perform V2X-like or VRU-eMobility-type services.

For VRU services (generated/handled by the said application) to access the protocol stack and, later, access the communication channel, said application associates with the DUb (e.g., smart phone) communication modules/protocol stack. In this case, the application securely accesses the radio interface / a modem of CUb, allowing access to both Uu (link to the network) communication link and sidelink communication link. In addition, the application running on DUb may be configured (offline) or pre-configured (by the network) to access the unlicensed/dedicated spectrum and/or licensed bands for Uu/sidelink for V2X/VRU/sidelink communication. Accordingly, the application also may receive VRU and V2X messages from the network and/or other users via the control unit CUb. The communication is initialized with the application running on DUb that has the right authorization in order to:

Authenticate with communication modules on CUb;

Compile and send VRU/V2X-like messages via CUb;

Authenticate the communication protocol stack to communicate to licensed or unlicensed/dedicated band;

Control the communication protocol stack identifying the right category or class of UE of the CUb for a certain purpose, e.g., VRU-pedestrian, VRU-eBike type, V2X-eLM, etc.;

Indicate the power category for lower layers on CUb;

Access the V2X and/or VRU (with different types) services protocol via CUb;

Send measurement report, mobility condition (speed, acceleration, . . . ) and localization information over Uu and/or sidelink transmission via CUb.

The application of DUb is also capable of associating with CUb using the secure communication channel CHb, which could be a communication via a secure near-field communication (NFC), Bluetooth communication, sidelink communication or direct communication (with sub 6 GHz, cm-wave, or mm-wave), other secure wireless communication. However, the application of DUb may associate with CUb using the charging cable (or any other cable) connecting the communication port of DUb to the control-board/lower-layer split of CUb. In order to guarantee secure communication (i.e., to be able to send V2X-like messages or eLM VRU messages), the following may be considered:

The secure channel CHb may be using a secure module regulated by the authority, a secure module regulated by a registered identifier, etc.

The application of DUb may use a vendor based secure association, i.e., the mobile application and the e-mobility chipset is from the same vendor.

The application may use a secure standardized key sharing

The application on DUb shall securely collect information from the available sensors via the CUb. Additionally, the application shall be able to collect information from the DUb, e.g., location/positioning information, navigation paths, weather conditions, etc. Furthermore, the application shall be able to collect information as received from other road partners, e.g., vehicles, pedestrian, other eLM, including their vulnerable road users awareness messages (VAM), cooperative awareness messages (CAM), cooperative perception messages (CPM), etc.

Based on the information collected from the sensors, information collected from the smart-device sensors, and/or information collected from cooperative awareness/perception messages (e.g., VAM, CAM2 CPM-Like, etc.), the application of DUb instructs, via CUb, the actuators of the vehicle BICb, which are connected to CUb, to perform one or more assisting riding, e.g.:

Assist ABS brakes;

Assist lights/warning; and

Assist motor acceleration/de-acceleration.

The DUb is connected to the CUb with one or more options, i.e., either wireless or wireline. The DUb running the application can have multiple battery status, e.g., charging-high, charging-low, not-charging-low, not charging-high, etc. The status of DUb includes at least one of the following: battery status, connectivity status (network, sidelink, or both, etc.). The capability information of the CUb comprises at least one of the following: speed monitor, speed control, brakes status, gyro-sensor, or electronic assisted ABS functionality, etc.

The invention claimed is:

1. A method for operating a control unit of a two-wheeled vehicle, the method comprising:

receiving with the control unit sensor information associated with a sensor of the vehicle;

transmitting from the control unit, via a communication channel between the control unit and a determination unit, the sensor information;

determining with the determination unit status information associated with the vehicle based on the sensor information;

receiving at the control unit, from the determination unit via the communication channel between the control unit and the determination unit, the status information associated with the vehicle as a response to the transmitted sensor information; and transmitting from the control unit, via a radio channel, a message including the status information associated with the vehicle to a further vehicle, wherein the determination unit includes a personal mobile device with a human user interface and is configured to be carried by a user of the vehicle, and the control unit is provided on the vehicle, and wherein the control unit has a reduced processing capacity with respect to a processing capacity of the determination unit and is not responsible for determining the status information, wherein processing capacity is a maximum amount of tasks capable of being performed in a given time.

2. The method according to claim 1, further comprising:

receiving at the control unit, via the radio channel, a vehicle-to-everything V2X message and/or a vulnerable road user VRU message, comprising status information associated with the further vehicle;

transmitting from the control unit to the determination unit, via the communication channel between the control unit and the determination unit, the received status information associated with the further vehicle;

receiving, via the communication channel between the control unit and the determination unit, reaction information; and operating the vehicle based on the reaction information.

3. The method according to claim 1, further comprising transmitting, via the communication channel between the control unit of the vehicle and the determination unit, capability information associated with the vehicle.

4. The method according to claim 1, wherein the user is an operator of the two-wheeled vehicle.

5. The method according to claim 1, wherein the communication channel is from a group consisting of near field communication, Bluetooth pairing, a dedicated link, and a sidelink.

6. The method according to claim 1, wherein the vehicle is a pedal electric cycle or an electric kick scooter with the control unit provided thereon.

7. The method according to claim 1, wherein the radio channel is from a group consisting of near field communication, Bluetooth pairing, Wi-Fi, a dedicated link, and a dedicated sidelink.

8. The method according to claim 1, wherein a frequency for transmitting the sensor information to the determination unit is modified based on status information of the determination unit.

9. The method according to claim 1, wherein the status information of the determination unit indicates a battery status of the determination unit.

10. A method for operating a determination unit of a personal mobile electronic device with a human user interface, the method comprising:

receiving at the determination unit, via a communication channel between the determination unit and a control unit provided on a vehicle, sensor information;

determining with the determination unit status information associated with the vehicle based on the sensor information;

transmitting from the determination unit, via the communication channel, between the determination unit and the control unit including the determined status information associated with the vehicle; and receiving environment information, wherein the personal mobile electronic device is carried by a user of the vehicle, and wherein the control unit has a reduced processing capacity with respect to a processing capacity of the determination unit and is not responsible for determining the status information, wherein processing capacity is a maximum amount of tasks capable of being performed in a given time.

11. The method according to claim 10, further comprising receiving, via the communication channel between the control unit and the determination unit, status information associated with a further vehicle;

determining at the determination unit reaction information based on the received status information associated with the further vehicle and the environment information; and transmitting from the determination unit, via the communication channel between the control unit and the determination unit, the determined reaction information, wherein the control unit operates the vehicle based on the determined reaction information.

12. The method according to claim 11, wherein the environment information is at least one selected from a group consisting of: a weather condition, position information from a location sensor, and a temperature.

13. The method according to claim 11, further comprising receiving at the determination unit, via the communication channel between the determination unit and the control unit of the vehicle, a capability information associated with the vehicle; and determining at the determination unit reaction information for the vehicle based on the status information associated with the further vehicle and on the received capability information.

14. The method according to claim 10, wherein the determination unit receives weather information over internet.

15. The method according to claim 10, wherein the determination unit receives weather information over internet via a cloud service.

16. The method according to claim 10, wherein the vehicle is a pedal electric cycle or an electric kick scooter with the control unit provided on the vehicle, and wherein the user is an operator of the pedal electric cycle or the electric kick scooter.

\* \* \* \* \*